United States Patent
Caroleo

[11] 3,745,640
[45] July 17, 1973

[54] METHODS OF INSTALLING AN ELONGATED, FLEXIBLE, ELECTRIC HEATER INTO A MATERIAL STORAGE TANK, AND HEATER CONSTRUCTION FOR THE SAME

[75] Inventor: Steven J. Caroleo, Coraopolis, Pa.

[73] Assignee: Emerson Electric Co., St. Louis, Mo.

[22] Filed: Dec. 10, 1971

[21] Appl. No.: 206,666

[52] U.S. Cl. .................................. 29/433, 29/469
[51] Int. Cl. ............................................. B23p 19/04
[58] Field of Search ............................ 29/433, 469; 254/134.3 FT

[56] References Cited
UNITED STATES PATENTS
3,239,928  3/1966  Baker................................ 29/433
3,611,549  10/1971  Pope................................. 29/433

*Primary Examiner*—Richard J. Herbst
*Attorney*—Michael Williams

[57] ABSTRACT

Methods of installing an elongated, flexible, electric heater into a material storage tank comprising attaching flexible cables to opposite ends of the heater while the same is disposed exteriorly of the tank, and utilizing such cables to guide the heater to a selected position within the tank. The invention also includes novel heater construction which is particularly useful in carrying out the methods.

7 Claims, 18 Drawing Figures

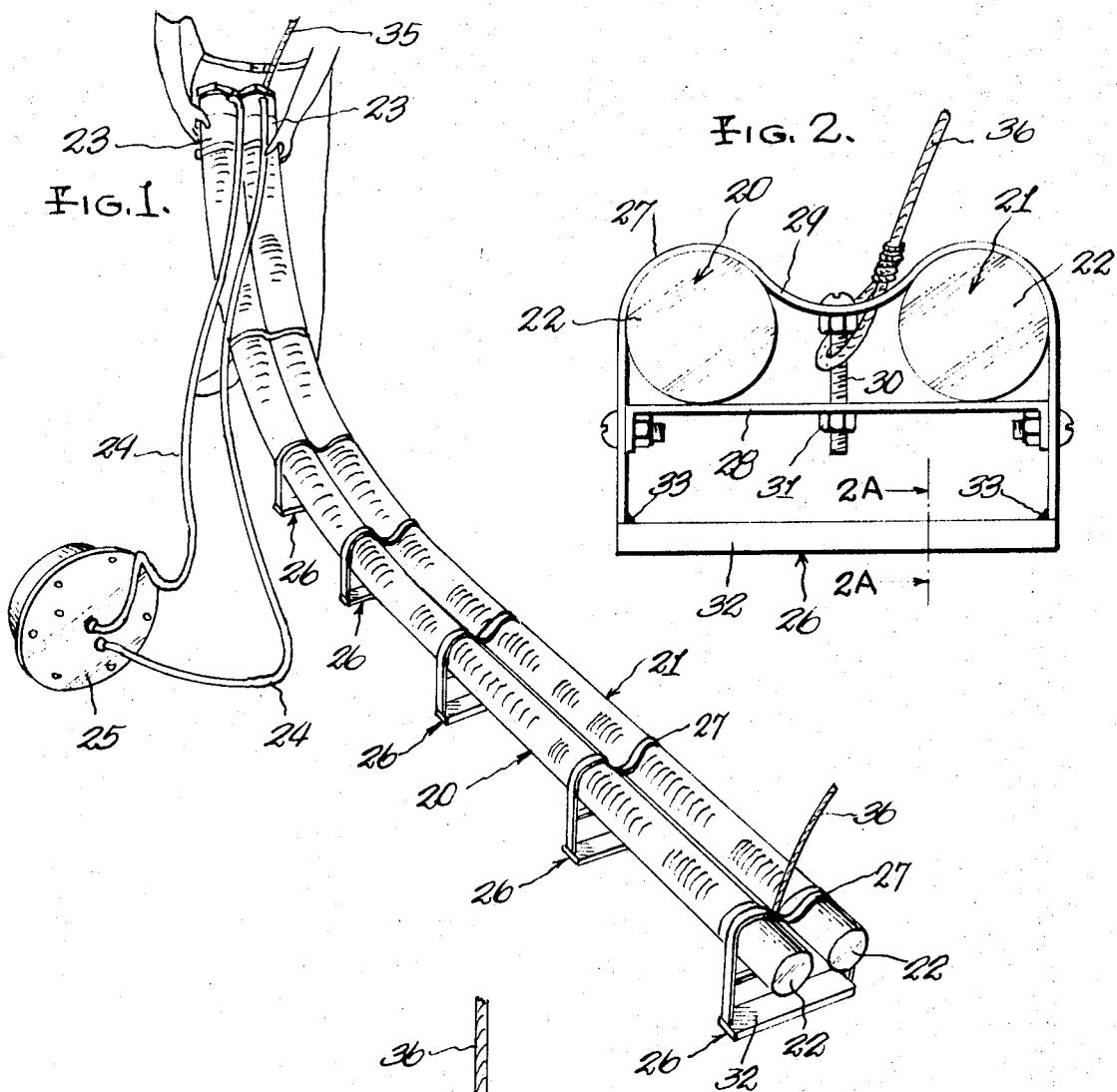

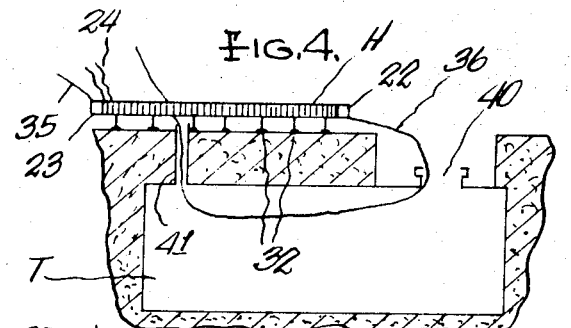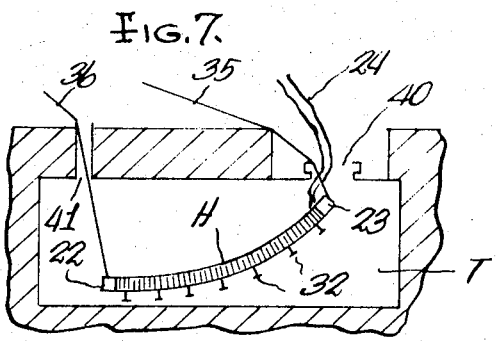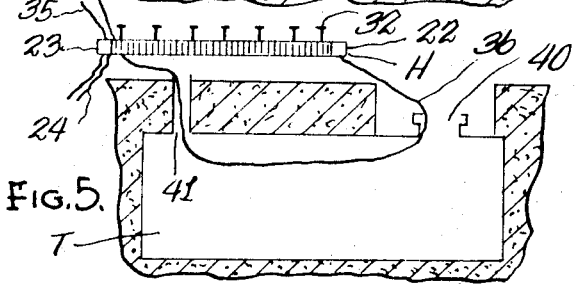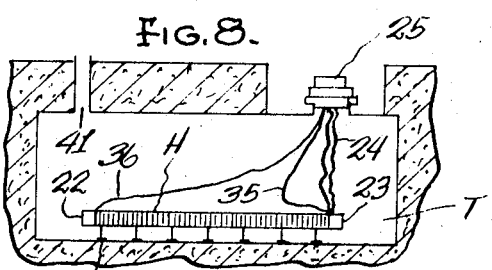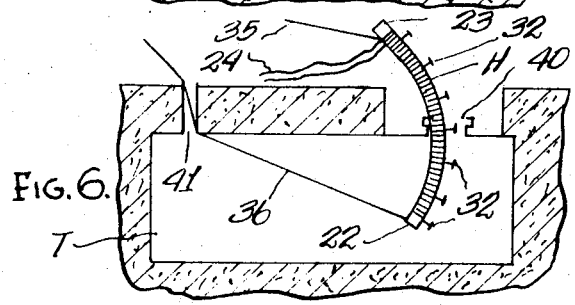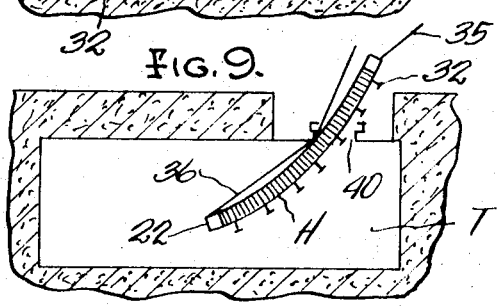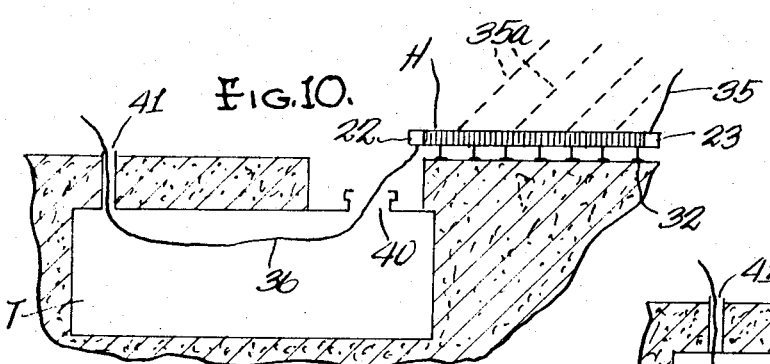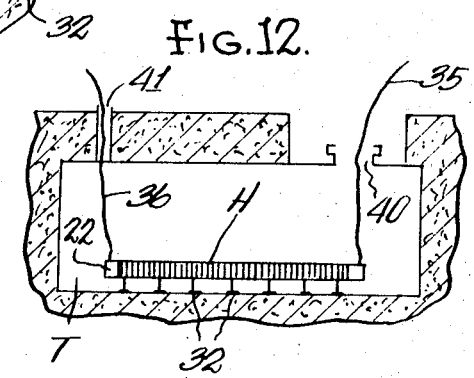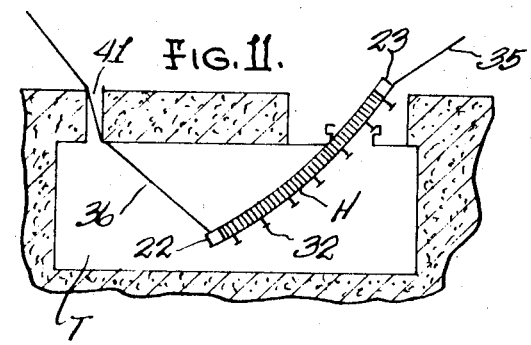

PATENTED JUL 17 1973 3,745,640

INVENTOR.
STEVEN J. CAROLEO
BY
Michael Williams
ATTORNEY

METHODS OF INSTALLING AN ELONGATED, FLEXIBLE, ELECTRIC HEATER INTO A MATERIAL STORAGE TANK, AND HEATER CONSTRUCTION FOR THE SAME

BACKGROUND AND SUMMARY

Many substances are stored in large, steel, concrete or fibrous tanks and require heat at all times, or periodically, to maintain such substance in fluid condition. Such tanks may be underground, above-ground, process vessels, or tanks enclosed in concrete, all having some sort of opening, such as a manhole entry.

Tanks containing fuel oil are included in this category, the oil having many uses, as for providing fuel for burners to provide heat for dwellings, or steam for generation of power. With the growing concern about air pollution, users have turned to a viscous fuel oil, having a low sulfur content, since it was found that combustion of this oil produced very little air-contaminated matter. However, a serious disadvantage arose because of the fact that this oil was required to be heated, otherwise it would congeal to a mass which could not be removed from the tank by the ordinary pumping equipment, or by gravity flow.

Tank heaters for heating high visosity materials, such as asphalt and heavy oils and other materials, are known in the art, and examples are illustrated in U.S. Pat. No. Re.20 954, issued to Alfred Karcher on Dec. 27, 1938, and U.S. Pat. No. 2 888 546, issued to Theodore S. Kenney on May 26, 1959.

Flexibility of the heater, at least in the longitudinal direction, is required in order to install the same through the manhole opening of the tank. These heaters are now made in lengths of from 12 feet to over 20 feet and it will be appreciated that their flexibility renders them limp and difficult to handle. This is so particularly where a heater is installed in a tank which already contains oil, since it is difficult to visually observe whether or not the heater has been properly moved to a desired position. Further, even if all oil has been pumped or drained from the tank, many states have regulations which forbid a person from entering a tank that contains oil, or has contained oil, because of the health hazards involved.

My invention makes it possible to dispose a flexible electric heater within a tank either containing oil, or free of oil, by means controlled from the exterior of the tank, and thus overcomes the various hazards and difficulties above mentioned.

DESCRIPTION OF THE DRAWINGS

In the drawing accompanying this description and forming a part of this specification, there are shown, for purposes of illustration, several embodiments which my invention may assume, and in these drawings:

FIG. 1 is a perspective view of a representative heater, showing a workman holding up one end to demonstrate the flexibility and length of the heater, FIG. 2 is an end view of the heater shown in FIG. 1, FIG. 2 A is a section corresponding to the line 2—2 of FIG. 2, FIG. 3 is an end view of a similar heater, but illustrating a single tube heater, FIGS. 4 through 8 are schematic views illustrating steps in the method of installing a flexible heater into a fluid storage tank, FIG. 9 is a schematic view illustrating another method of installing the heater, FIGS. 10 through 12 are schematic views illustrating steps in still another method of installing the heater into the tank.

DESCRIPTION OF THE PREFERRED EMBODIMENT

Figure 13:
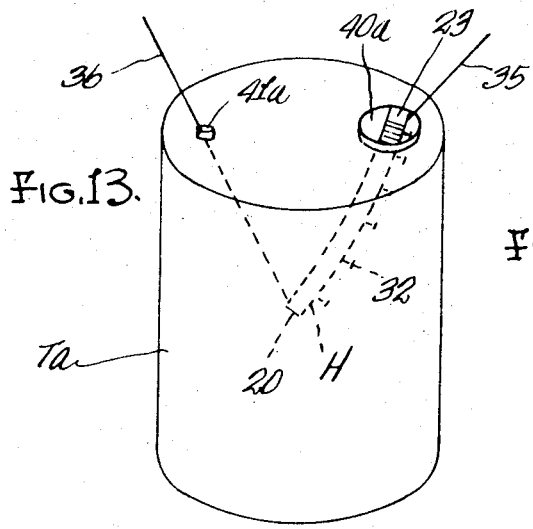
FIG. 13 and 14 are schematic views illustrating steps in installing a heater in a vertically disposed tank.

The heater shown in FIG. 1 comprises a pair of metallic sheaths 20, 21 formed of flexible tubing, such as corrugated metal tubing. Within each sheath is an elongated resistance wire which is insulated from the sheath but is permitted to flex therewith. A form of resistance wire and insulator means which may be utilized is shown in the aforementiond Kinney patent.

Each sheath is closed at the ends 22, and the opposite ends 23 are also closed except for passage of flexible power conductors 24 which extend to a cover 25. The cover 25 is adapted to be bolted to the tank to close the manhole opening therein, and conductor means (not shown) are adapted to connect to a control box (also not shown) for controlling flow of electrical energy to the resistor wire in the sheaths 20, 21. Suitable control means (not shown) may be used to regulate energization of the resistor wires, dependent upon the temperature of the fluid in the tank and upon the sheath temperature of the heaters.

Supports 26 are connected to the sheaths 20, 21 at places spaced longitudinally thereof, to hold the heater spaced from the bottom of the tank and out of any sludge that might collect at the tank bottom. In the case where the heater is formed of two sheaths, as seen in FIGS. 1 and 2, the supports 26 also hold these sheaths in fixed laterally spaced relation. Each support, as best seen in FIG. 2, comprises a U-shaped metal strap 27 and a cross-bar 28 bolted to respective legs of the strap. Each strap has pockets to partially embrace a respective sheath, the pockets in part being formed by a downwardly curved central portion 29. A bolt 30 is passed through aligned openings in the central portion 29 and the cross-bar 28 and a nut 31 on the bolt provides a pulling force so that the pockets of the straps tightly embrace respective sheaths to hold them firmly spaced. A metal foot 32 spans the ends of the legs of the strap 27 and is affixed thereto in any suitable manner, such as by welding 33. It will be noted that the foot is of considerable thickness and this is desirable to provide weight, and to lower the center of gravity of the heater. Thus, as the heater is installed in the tank, the weight of the feet of the plurality of supports 26 causes the heater to gravitate to the bottom of the tank, even in liquids of high density of viscosity. Also, because the weighted feet 32 provide a lower center of gravity, the heater will gravitate to the tank bottom with the feet lowermost. AS best seen in FIG. 2 A, each foot is bevelled, as seen at 32.1 so that it may glide over obstructions, such as welding ridges, on the lowermost wall of the tank.

Flexible cables 35,36 are attached to the opposite ends of the heater, as seen in FIG. 1, and FIG. 2 shows one method of attaching the cables. Only the cable 36 is seen in FIG. 2 but it will be appreciated that the cables 35 may be similarly attached. It has been found that if the cable 36 is looped around the bolt 30, the connection is suitable for installation purposes without imposing detrimental stresses on the heater construction.

The heater may be formed with only a single sheath 37, as seen in FIG. 3, in which case each support 26a comprises a U-shaped, metal strap 27a having a single pocket for partially encircling the sheath, and a crossbar 28a for confining the sheath. A weight foot 32a is secured to the ends of the strap legs, for the same purpose as the foot 32. FIGS. 2 and 3 show double and single sheaths, respectively, but three of more sheaths may be utilized, depending upon heating requirements. Since no bolt (like bolt 30) is required in FIG. 3, the cable 36 may be anchored to an eye welded to the end of the sheath.

Since the sheaths 20,21 (or 37) are very flexible, it will be appreciated that an elongated flexible heater is extremely difficult to handle, particularly during the time it is being installed into the tank.

FIGS. 4 through 8 show steps in a preferred method of installing an elongated flexible heater, of the types shown in FIGS. 1 and 3, into a tank. The tank T in this case is underground, with its longitudinal axis horizontal and with a manhole opening 40 and a vent or fill pipe 41 in the uppermost side wall of the tank, these openings being spaced substantial distance.

As seen in FIG. 4 the heater H, which is representative of a single or plural type sheath, is aligned along the centerline of the tank with the end 22 spaced to one side of the manhole opening. If the cables 35,36 have not been previously connected to the heater, they may be connected at this time. Also, a safety cable (not shown) may be tied to the flexible power conductors 24 to hold them from being pulled into the tank too soon, since such conductors are preferably not connected to the cover 25 at the time the heater is installed into the tank. It will be noted that the feet 32 rest against the upper surface of the ground in FIG. 4 to provide firm support therefore during all operations preparatory for installation. The cable 36 is disposed through the manhole opening 40, through the tank T and through and outwardly of the pipe 41. This may be accomplished by snaking a wire through the pipe 41, through the tank T and the manhole opening 40, and attaching it to the free end of the cable 36, and then pulling the wire in the reverse direction to pull the cable 36 to the position shown in FIG. 4.

The heater H is then turned over so that the feet 32 are uppermost, as seen in FIG. 5, and a workman may insert the end 22 into the manhole while others control pulling force on the cables 35,36. The heater will flex longitudinally, as seen in FIG. 6 and, since the feet 32 are disposed away from engagement with the defining surface of the manhole opening 40, the heater will smoothly slide over such surface.

A pulling force applied to cable 36 will cause the heater end 20 to be drawn toward the left end of the tank, while a pulling force on the cable 35 (less than applied to cable 36) will guide the heater end 23 through the manhole opening 40, as seen in FIG. 7. It will be noted that the heater has been righted in this operation so that the feet 32 are lowermost. After the heater is fully disposed within the tank, the pulling forces on the cables 35,36 may be gradually slackened so that the weight of the feet 32 will cause the heater to gravitate to the bottom of the tank as seen in FIG. 8.

Before the manhole cover 25 is bolted in place, the conductors 24 are properly connected to it and the cables 35,36 are secured to a suitable connection on the underside of the cover so as to be accessible for use in the event the heater H is to be withdrawn from the tank T for replacement, or repair and return. As seen in FIG. 8, the low profile of the heater provides for maximum use of tank volume, and permits heat to be maintained in the oil even at low levels thereof. Further, through use of my invention, the heater may be installed in presently used tanks with no tank modifications or cleaning required.

DISCLOSURE OF OTHER EMBODIMENTS

FIG. 9 shows a method of installing the heater H into a tank T which has no vent or fill pipe. The cables 35,36 as before, are attached to the opposite ends of the heater. In this case, the end 22 of the heater is inserted into the tank and is guided by pulling forces on the cables, both of which in this case extend through the manhole opening. It will be noted that the cable 35 may be used to maintain the feet 32 away from contact with the defining wall of the manhole opening.

FIGS. 10 through 12 illustrate steps in installing a heater H within a tank T along the lines of the modification shown in FIG. 9, except that the tank in this case is provided with a vent or fill pipe 41. In FIG. 10, the heater is shown as disposed to the right of the manhole opening 40 with its feet 32 resting on the ground support. The cable 36 has been drawn through the pipe 41 and the forward end 22 of the heater may be lifted by a workman and inserted into the manhole opening. As seen in FIG. 11 the cable 35 may be used to keep the feet 32 clear of the defining surface of the manhole opening while a pulling force is applied to the cable 36. When the heater is entirely within the tank T, it is permitted to gravitate to the bottom wall thereof, and is guided to selected longitudinal position by pulling force applied to the cables. In case the heater is extremely long, or extremely flexible, a plurality of cables may be attached at spaced supports 26 along its length, as shown by the dotted lines referenced 35a in FIG. 10.

Figure 14:
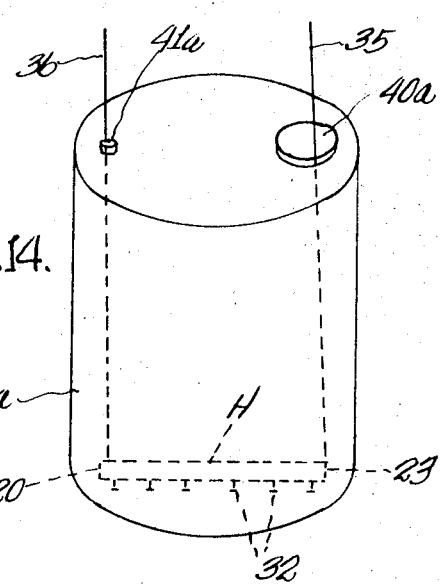

FIGS. 13 and 14 illustrate steps in the method of installing a heater H within a tank Ta which has its longitudinal axis vertical and has a manhole opening 40a and a vent of filler pipe 41a in its top end wall. As before, the cable 36 is connected to the end 20 of the heater and drawn through the pipe 41a, and the cable 35 is connected to the end 23 of the heater and is utilized to hold the feet 32 clear of the manhole opening. After the heater is fully disposed in the tank Ta, it is permitted to gravitate to the lower end thereof, pulling forces on the cables being controlled to dispose the heater in selected position on the bottom of the tank.

Figure 15:
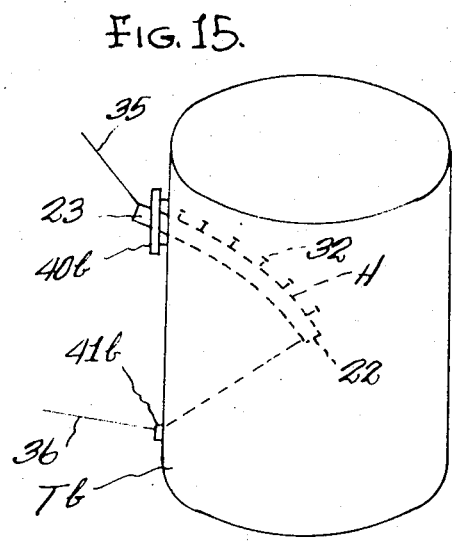
FIGS. 15 through 17 are schematic views illustrating steps in installing a heater in a vertically disposed tank wherein the manhole opening is at the side of the tank.
Figure 16:
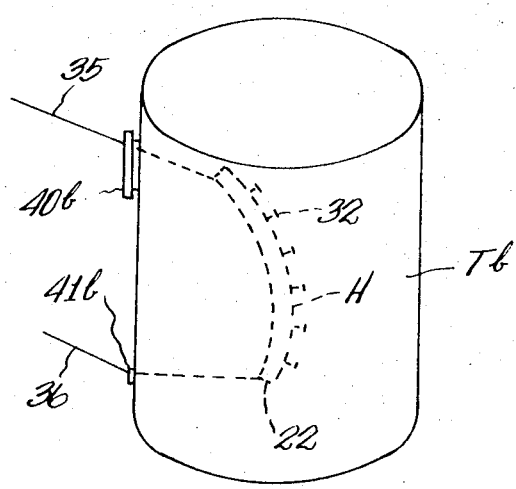
Figure 17:
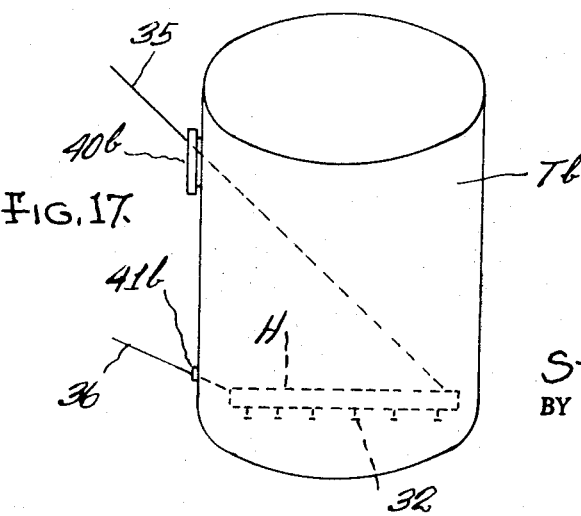

FIGS. 15 through 17 illustrate the steps used in inserting a heater H in a vertically disposed tank Tb wherein the manhole opening 40b and vent or filler pipe 41b are disposed in the side wall of the tank with the manhole opening uppermost. In this case the heater is inverted, so that its feet 32 are uppermost, and the end 22 is inserted horizontally into the manhole opening until a sufficient length of heater is within the tank to permit longitudinal bending thereof by a pulling force on cable 36. The heater is righted within the tank so that the feet 32 are lowermost, and the heater is then permitted to gravitate to the tank bottom.

I claim:

1. A method relating to the assembly of an electric heater within a fluid storage tank;
   wherein said tank has a manhole opening in a defining wall, and
   wherein said heater is an elongated flexible heater comprising a metal sheath formed of flexible tubing such as corrugated metal tubing, said sheath containing an elongated electric heating element which is insulated from the sheath but permitted to flex therewith, said sheath having one end closed and an opposite end which is also closed except for the passage of a power supply line adapted to connect said heating element to a source of electrical power:
   the improved method of displacing said flexible heater from a position exteriorly of said tank to a selected position within and along the lowermost portion of the tank, comprising:
   attaching first and second flexible cables respectively to said one end and said opposite end of said heater,
   longitudinally moving said flexible heater relative to said tank and bending it along its longitudinal axis and entering it into said tank with said one end foremost,
   and permitting said flexible heater to settle toward the lowermost portion of said tank while controlling pulling force on said first and second cables to guide said heater to selected position within said tank.

2. A method relating to the assembly of an electric heater within a fluid storage tank:
   wherein said tank has a manhole opening in a defining wall and a further opening in such wall, said openings being spaced a substantial distance, and
   wherein said heater is an elongated flexible heater comprising a metal sheath formed of flexible tubing such as corrugated metal tubing, said sheath containing an elongated electric heating element which is insulated from the sheath but permitted to flex therewith, said sheath having one end closed and an opposite end which is also closed except for the passage of a power supply line adapted to connect said heating element to a source of electrical power:
   the improved method of displacing said flexible heater from a position exteriorly of said tank to a selected position within and along the lowermost portion of the tank, comprising:
   attaching first and second flexible cables respectively to said one end and said opposite end of said heater,
   threading said first cable through said manhole opening and into said tank, through said tank and through and outwardly of said further opening,
   longitudinally moving said flexible heater relative to said tank and bending it along its longitudinal axis and entering said one end into said tank through said manhole opening,
   pulling on said first cable to pull the remainder of said flexible heater into said tank while holding onto said second cable to restrain and guide said opposite end through said manhole opening,
   and permitting said flexible heater to settle toward the lowermost portion of said tank while controlling pulling force on said first and second cables to guide said heater to selected position within said tank.

3. The method according to claim 1, wherien said heater has a plurality of feet connected to said sheath at spaced places longitudinally of the latter for supporting the sheath in spaced relation from the lowermost portion of said tank,
   said method including the steps of supporting said heater exteriorly of said tank with said one end adjacent to said manhole opening and with the heater inverted so that said feet are uppermost, and
   bending said heater longitudinally within said tank by pulling force applied to said cables to right said heater and thus bring said feet lowermost by the time said heater settles to the lowermost portion of said tank.

4. The method according to claim 1 wherein said heater has a plurality of feet connected to said sheath at spaced places longitudinally of the latter for supporting the sheath in spaced relation from the lowermost portion of the tank, each foot providing a weight,
   said method including the step of utilizing the weight of said feet to assist in the settling of said heater to the lowermost portion of the tank.

5. The method of claim 2 wherien said tank is disposed within its longitudinal axis horizontal and wherein said manhole opening and said further opening are in the uppermost portion of the side wall of said tank,
   the method including the step of supporting said heater longitudinally and exteriorly of said tank with said one end adjacent to said manhole opening, prior to insertion of said heater into said manhole opening.

6. The method of claim 2 wherein said tank is disposed with its longitudinal axis vertical and wherein said manhole opening and said further opening are in the upper end wall of said tank,
   including the step of entering said one end of said heater into said tank by moving it vertically through said manhole opening until sufficient heater length is disposed within said tank to permit said heater to be bent longitudinally by a pulling force applied to said first cable.

7. The method of claim 2 wherein said tank is disposed with its longitudinal axis vertical and wherein said manhole opening and said further opening are in the side wall of said tank with said manhole opening uppermost, and wherein said heater has a plurality of feet connected to said sheath at spaced places longitudinally of the latter for supporting the sheath in spaced relation from the lower end wall of said tank,
   said method including the steps of supporting said heater exteriorly of said tank with the heater inverted so that its feet are uppermost,
   entering said heater one end into said tank by moving it horizontally through said manhole opening until sufficient length is disposed within said tank to permit said heater to be bent longitudinally by pulling force applied to said cables,
   and controlling such pulling force to right said heater and to thus bring said feet lowermost by the time said heater settles to the lower end wall of said tank.

* * * * *